UNITED STATES PATENT OFFICE.

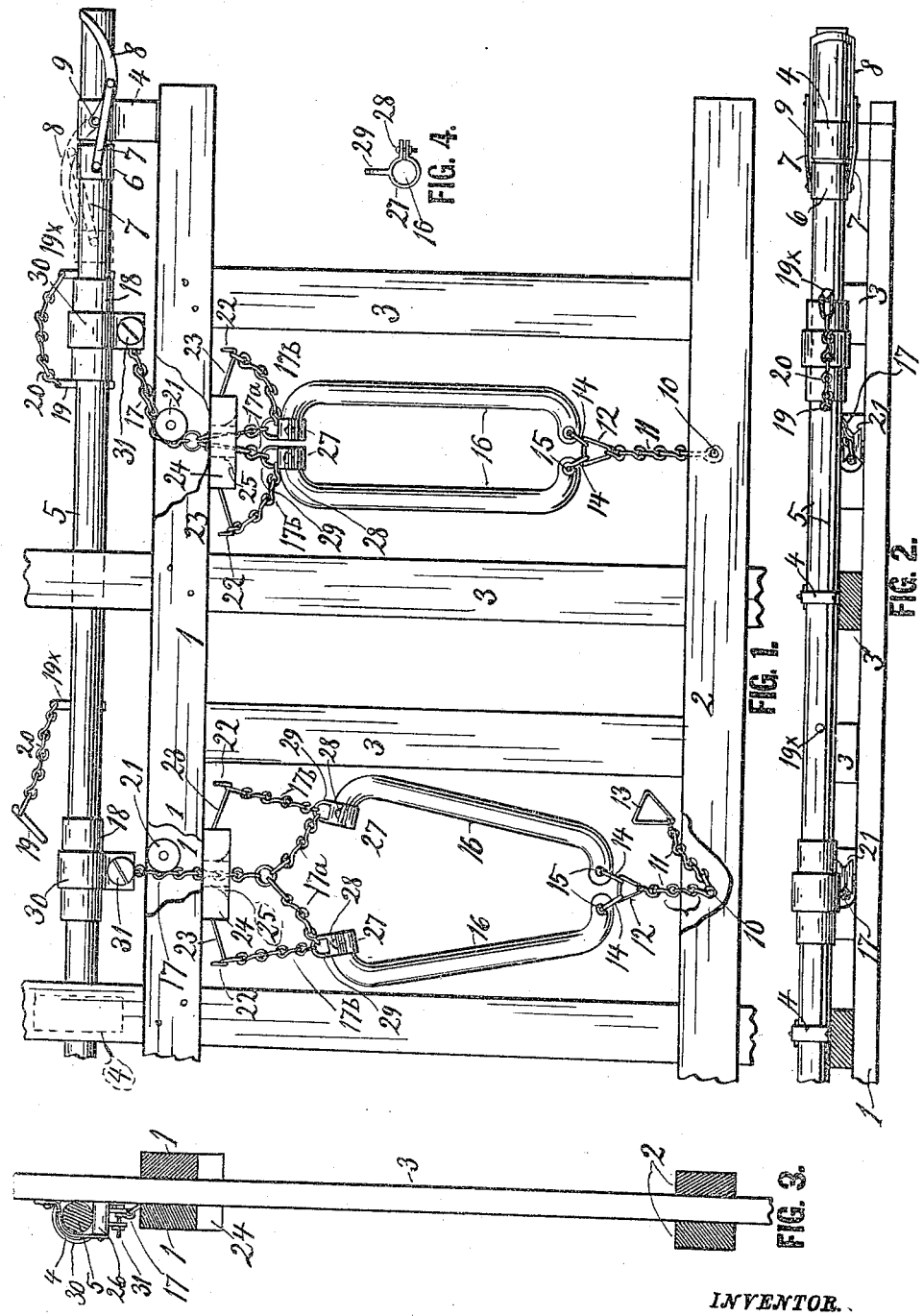

NELS PEDERSON, OF TRENT, SOUTH DAKOTA.

STANCHION.

1,194,782.  Specification of Letters Patent.  Patented Aug. 15, 1916.

Application filed March 27, 1916. Serial No. 86,861.

*To all whom it may concern:*

Be it known that I, NELS PEDERSON, a citizen of the United States, residing at Trent, in the county of Moody and State of South Dakota, have invented a new and useful Stanchion, of which the following is a specification.

My invention relates to cattle stanchions, and the object is to provide an efficient stanchion of such construction that it may be applied to animals of different sizes and by which a series of animals may be attached or detached in a single operation, or either one or more animals in a series may be attached or released independently of the other animals in the series.

In the accompanying drawing, Figure 1 is a front elevation of a portion of a series of stanchions embodying my improvements. Fig. 2 is a top view of Fig. 1. Fig. 3 is a left hand end view of Fig. 1. Fig. 4 is a detail view of the collar 27.

Referring to the drawing by reference numerals, 1 designates upper and 2 lower pairs of horizontal timbers secured to uprights 3 which may be secured in the ground or to the structure of a barn used for housing cows and other similar animals. A suitable distance higher up than the bars 1 is mounted to slide in bearings 4 a rod 5, upon which is secured a collar 6. At the front and rear side of the collar are pivoted the ends of two links 7, which have their other ends pivoted to a U-shaped lever 8, which is fulcrumed at 9 to one of the bearings 4.

At each place designed to be occupied by the neck of an animal the lower timbers 2 are provided with a pin or bolt 10 upon which one of the middle links of a short chain 11 is placed. One end or arm of the chain is provided with a small ring 12, the other with a larger ring 13. The rings are preferably tri-angular and either of them is easily attached by two clevises 14 and bolts 15 to the perforated lower ends of a pair of hames 16. Said pair of hames is suspended by a chain 17 from a sleeve 18, which is slidable on the rod 5, where it is normally prevented from sliding by two pins 19, 19× dropped into holes in the rod and attached together by a chain 20. The chain 17 hangs normally plumb down close by a pulley 21 mounted between the timbers 1, and is therebelow bifurcated into two branches 17ª, which are secured to the upper ends of the hames. To said upper ends are also secured two other short chains 17ᵇ, whose upper ends are supported on two hooks 22 fixed in a block 24 and having long inclined shanks 23. Said block 24 is secured up under the timbers 1 and provided with a downwardly flared aperture 25 for the chain 17, 17ª to slide through.

In the operation of the device, if a single animal is to be fastened in the stanchion, the pin 19 is raised as to the left in Fig. 1 so the weight of the hames 16 will pull the sleeve 18 over the hames. This causes the hames to be lowered and also spread by being supported from the chains 17ᵇ and the hooks 22; the animal is then placed with its neck between the hames and the sleeve 18 pushed against the pin 19× and the pin 19 replaced. Said movement of the sleeve causes the chains 17ª to close together in the aperture 25, whereby the hames are raised and closed together. When a single animal is to be detached, the pin 19 is simply raised and the hames will drop and open automatically from their own weight. If all the animals in a series of stanchions are to be fastened at one time they are simply driven into several pairs of hames and all the hames raised and closed by swinging the lever 8 from the dotted to the full line position shown in Fig. 1, thus sliding the rod 5 to the right and pulling on all the chains 17, and by swinging said lever in the reverse direction all the hames are lowered and opened so the animals can be driven away from the stanchions. For an extra large animal the large ring 13 may be put in the clevises 14, to allow the hames to spread apart more than if the small ring 12 is used for smaller animals.

The rod 5 rests on rollers 26 (see Fig. 3) to make it slide easy even if it be long enough for a great number of hames. And to facilitate changing and repair of the various parts, not only the clevises are removable from the apertures in the lower ends of the hames, but the chains are also attached to the upper ends by collars 27 which are open at one side and provided with a screw or bolt 28 by which they are closed tightly about the ends of the hames; said collars having each an eye 29 in which the chains are attached. In similar manner each sleeve 18 is clamped in an open-sided collar 30 having a clamping bolt 31, which also serves to hold the upper end of the chain 17.

What I claim is:—

1. In a device of the class described, the combination with a frame, of one or more stanchions supported therein, each stanchion comprising two hame-shaped bars each with a clevis detachably attached to its lower end, a chain fastened in the lower part of the frame and having at one end a small ring and at the other end a large ring adapted to be alternately attached in said clevises.

2. In a device of the class described, the combination with a frame having in its upper part one or more downwardly flared apertures, a main chain extending downward through each aperture and formed at its lower end with two branches, a pair of hame-shaped stanchion members suspended one from each of said branches, horizontally slidable means above the aperture for raising and lowering the chain, and two other flexible members attached to the upper ends of the hames and having their upper ends secured to the frame in diametrically opposite directions from the aperture, so as to cause the hames to spread automatically by their weight when lowered by the chains in the aperture, and a flexible member attaching the lower ends of the hames to the lower part of the frame.

3. In a device of the class described, the combination with a frame having in its upper part one or more downwardly flared apertures, a main chain extending downward through each aperture and formed at its lower end with two branches, a pair of hame-shaped stanchion members suspended one from each of said branches, horizontally slidable means above the aperture for raising and lowering the chain, and two other flexible members attached to the upper ends of the hames and having their upper ends secured to the frame in diametrically opposite directions from the aperture, so as to cause the hames to spread automatically by their weight when lowered by the chains in the aperture, and a flexible member attaching the lower ends of the hames to the lower part of the frame, said means for raising and lowering the main chain comprising a horizontally slidable rod in the upper part of the frame, means for sliding and holding said rod in two different positions, slidable members on the rod for attaching several of the main chains thereto and movable locking means for holding the slidable members in their positions.

4. In a device of the class described, the combination with a frame having in its upper part one or more downwardly flared apertures, a main chain extending downward through each aperture and formed at its lower end with two branches, a pair of hame-shaped stanchion members suspended one from each of said branches, means above the aperture for raising and lowering the chain, and two other flexible members attached to the upper ends of the hames and having their upper ends secured to the frame in diametrically opposite directions from the aperture, so as to cause the hames to spread when lowered by the chains in the apertures, and a flexible member attaching the lower ends of the hames to the lower part of the frame, said means for raising and lowering the main chain comprising a horizontally slidable rod in the upper part of the frame, means for sliding and holding said rod in two different positions and means for attaching several of the main chains to the rod, said attaching means for the main chains consisting of sleeves slidable on the rod and removable pins inserted in the rod one at each end of each sleeve.

5. In cattle stanchions, and mounted in a suitable frame, the combination with a rod slidable in the upper part of the frame, a plurality of sleeves slidably mounted on the rod, means for holding the sleeves against sliding movement when so desired and means for sliding and holding the rod alternately in two different positions, clamping rings secured one about each sleeve, a chain attached with its upper end to each clamping ring, and a pair of stanchion bars suspended from each chain, and means for guiding said chain vertically up and down in the frame.

In testimony whereof I affix my signature.

NELS PEDERSON.

Copies of this patent may be obtained for five cents each, by addressing the "Commissioner of Patents, Washington, D. C."